United States Patent
Matzner

(10) Patent No.: US 10,861,172 B2
(45) Date of Patent: Dec. 8, 2020

(54) SENSORS AND METHODS FOR MONITORING FLYING OBJECTS

(71) Applicant: BATTELLE MEMORIAL INSTITUTE, Richland, WA (US)

(72) Inventor: Shari Matzner, Sequim, WA (US)

(73) Assignee: Battelle Memorial Institute, Richland, WA (US)

( * ) Notice: Subject to any disclaimer, the term of this patent is extended or adjusted under 35 U.S.C. 154(b) by 114 days.

(21) Appl. No.: 16/203,115

(22) Filed: Nov. 28, 2018

(65) Prior Publication Data

US 2020/0167938 A1 May 28, 2020

(51) Int. Cl.
| | |
|---|---|
| G06T 7/00 | (2017.01) |
| G06T 7/285 | (2017.01) |
| H04N 13/122 | (2018.01) |
| H04N 13/279 | (2018.01) |
| G01J 5/00 | (2006.01) |
| G06T 7/593 | (2017.01) |
| G06K 9/00 | (2006.01) |
| G06K 9/62 | (2006.01) |
| G06T 7/70 | (2017.01) |

(52) U.S. Cl.
CPC .......... G06T 7/285 (2017.01); G01J 5/0025 (2013.01); G06K 9/00362 (2013.01); G06K 9/6202 (2013.01); G06K 9/6212 (2013.01); G06T 7/593 (2017.01); G06T 7/70 (2017.01); G06T 7/97 (2017.01); H04N 13/122 (2018.05); H04N 13/279 (2018.05); *G01J 2005/0077* (2013.01); *G06T 2207/10021* (2013.01)

(58) Field of Classification Search
CPC ................................ G06T 7/285; G06T 7/593
See application file for complete search history.

(56) References Cited

U.S. PATENT DOCUMENTS

| | | | |
|---|---|---|---|
| 7,864,103 B2 | 1/2011 | Weber et al. | |
| 8,502,730 B2 | 8/2013 | Roche | |
| 9,521,830 B2 | 12/2016 | Wenger et al. | |
| 2014/0241612 A1* | 8/2014 | Rhemann ................ | G06T 7/593 382/154 |

(Continued)

OTHER PUBLICATIONS

Carter, D. B., et al., In situ and Operando, Transmission Microscopy, Springer International Publishing, Switzerland, 2016, DOI 10.1007/978-3-319-26651-0_2.

(Continued)

*Primary Examiner* — Tuan H Nguyen
(74) *Attorney, Agent, or Firm* — Derek H. Maughan

(57) ABSTRACT

Described herein are sensing methods, sensor systems, and non-transitory, computer-readable, storage media having programs for long-duration, continuous monitoring of flying objects during the day or the night and regardless of weather conditions. The methods and systems are computationally efficient and can provide compact, three-dimensional representations of motion from the observed object. A 3D track of the flying object can be generated from a point-matched pair of stereo composite motion track images and not directly from the videos, wherein each composite motion track image is based on a composite of a plurality of video frames composited in part according to video frame numbers.

19 Claims, 12 Drawing Sheets

(56) References Cited

U.S. PATENT DOCUMENTS

2017/0177937 A1* 6/2017 Harmsen ................ G05D 1/101

OTHER PUBLICATIONS

Cullinan, V. I., et al., Classification of birds and bats using flight tracks, Ecological Informatics, 27, 2016, 55-63.
Matzner, S., et al., Two-dimensional thermal video analysis of offshore bird and bat flight, Ecological Informatics, 30, 2015, 20-28.
Matzner, S., Night vision for bird- and bat-friendly offshore wind power, ScienceDaily, DOE/Pacific Northwest National Laboratory, Aug. 11, 2017.
DOE/Pacific Northwest National Laboratory, Night vision for bird- and bat-friendly offshore wind power: ThermalTracker software can aid responsible wind farm siting and operations, ScienceDaily, Aug. 11, 2017. <www.sciencedaily.com/releases/2017/08/170811102018.htm>.
Photonics, Thermaltracker Software Identifies Offshore Animals in Thermal Video. Aug. 29, 2017. Photonics Media. Aug. 16, 2018.

* cited by examiner

US 10,861,172 B2

SENSORS AND METHODS FOR MONITORING FLYING OBJECTS

ACKNOWLEDGEMENT OF GOVERNMENT SUPPORT

This invention was made with Government support under Contract DE-AC0576RL01830 awarded by the U.S. Department of Energy. The Government has certain rights in the invention.

FIELD

The present disclosure relates to monitoring flying objects and more particularly to computationally efficient, continuous monitoring of flying objects in three dimensions.

BACKGROUND

At least for security and environmental conservation concerns, a need exists for long-duration, continuous monitoring (or sensing) of flying objects in the vicinity of valued assets. For example, one motivation is a need to monitor bird and/or bat activity at wind energy locations, especially those that are offshore. Very little is known about the impacts of offshore wind turbines on avian populations in the United States. Research in Europe provides information on how birds respond to offshore wind, e.g., direct collision mortality and avoidance, but these behaviors are species-specific and there are substantial data gaps regarding how North American species will respond and how vulnerable seabird populations in the United States will be affected. The most significant potential effects are collision mortality and displacement, which leads to barrier effects and habitat loss. Risk models are used to estimate these effects during the siting and permitting phases of a wind energy project, but current risk models lack species-specific data with appropriate temporal scales to capture diel and seasonal patterns. The result is that permits may impose excessive monitoring and mitigation requirements on the wind farm operator that are difficult or costly to fulfill with existing technology, particularly at remote offshore locations. Certain species are nocturnal, which presents a challenge to existing systems rely on available light. Additionally, detection systems are typically incapable of long-term continuous monitoring because of an inability to manage large volumes of data.

SUMMARY

Disclosed are sensing methods, sensor systems, and non-transitory, computer-readable storage media for monitoring flying objects in three dimensions. Embodiments described herein are computationally efficient and can uniquely address the problem of excessively large datasets and/or computationally-intensive processing associated with long-term, continuous, 3D tracking of flying objects by stereo vision processing of a pair of images composited from video frames and not of video frames themselves.

In some embodiments, a sensing method comprises, for each of a stereo pair of thermal cameras providing thermal video, combining a sequence of video frames into a single composite motion track image, wherein each pixel value in the composite motion track image is a peak value of a pixel location over the sequence of video frames; detecting bright pixels in the composite motion track image that correspond to a flying object; connecting a plurality of adjacent bright pixels into a blob; and assigning each blob to a 2D flight track in sequential order according to a time index associated with each blob. The method further comprises, for a stereo pair of composite motion track images, matching a subset of points in one composite motion track image with a subset of points in the other composite motion track image based at least on the time indices, thereby yielding a point-matched pair of stereo composite motion track images; and generating a depth map based on the point-matched pair of images.

In certain embodiments, the flying object is a flying animal or an unmanned aerial vehicle (UAV). In certain embodiments, the method can further comprise representing the blobs as data structures stored on non-transitory, computer-readable storage media, the data structures comprising a list of member pixels and an associated time index for member pixels. In certain embodiments, said yielding a point-matched pair of stereo composite motion track images occurs at a speed that is at least as fast as the frame rate of the thermal video such that the method is a real-time method.

In certain embodiments, the method can further comprise estimating an altitude of the flying object, a camera-to-flying-object distance, or both based on the depth map. In certain embodiments, the method can further comprise estimating a size of the flying object based on the depth map, camera resolution, and camera field of view. In certain embodiments, the method can further comprise tracking fluctuations in blob size in one or both of the stereo pair of composite motion track images and correlating the fluctuations in blob size to wing beats of a flying animal or rotor rotations of a UAV. In certain embodiments, the method can further comprise inferring a flying-animal species identification based on the depth map, a calculated size of the flying object, fluctuations in blob size, flight track, or combinations thereof. Examples of the size of the flying object can include wing span, body length, or both. Flight tracks can be straight or curved and can include sharp turns. Size and flight behaviors can be indicative of species of the animals and can assist in identification of the flying object.

In certain embodiments, the stereo pair of composite motion track images each has a file size that is smaller than that of the thermal videos by at least a factor of 1/(frame rate×composite video clip duration).

In certain embodiments, the said matching step can further comprise comparing points in the one composite motion track image with points in the other composite motion track image only when the points in each image belong to blobs with the same frame index, and the blobs belong to corresponding tracks in each composite motion track image.

In certain embodiments, the stereo pair of thermal cameras are arranged on, or in the vicinity of, a wind turbine and further comprising monitoring a swept area of the wind turbine.

In some embodiments, a non-transitory computer readable storage medium can store one or more programs, the one or more programs comprising instructions, which when executed by one or more processors of an electronic device with access to video from a stereo pair of thermal cameras, cause the device, for each thermal camera in the stereo pair of thermal cameras, to combine a sequence of video frames into a single composite motion track image, wherein each pixel value in the composite motion track image is a peak value of a pixel location over the sequence of video frames. The device can further be caused to connect a group of adjacent pixels into blobs corresponding to an individual flying object; and to assign each blob to a 2D flight track in sequential order according to a time index associated with each blob. For a stereo pair of composite motion track images, the device can further be caused to match a subset of points in one composite motion track image with a subset of points in the other composite motion track image based at least on time indices, thereby yielding a point-matched pair of stereo composite motion track images; and to generate a depth map based on the point-matched pair of images.

In certain embodiments, the flying object is a flying animal or an unmanned aerial vehicle (UAV). In certain embodiments, the one or more programs, when executed, further cause the device to represent the blobs as data structures comprising a list of member pixels and an associated time index for member pixels. In certain embodiments, the time index comprises a video frame number.

In certain embodiments, the one or more programs, when executed, further cause the device to estimate an altitude of the flying object, a camera-to-flying-object distance, or both based on the depth map. In certain embodiments, the one or more programs, when executed, further cause the device to estimate a size of the flying object based on the depth map. In certain embodiments, the one or more programs, when executed, further cause the device to track changes in blob size in one or both of the stereo pair of composite motion track images and correlating the changes in blob size to wing beats of a flying animal or rotor rotations of a UAV. In certain embodiments, the one or more programs, when executed, further cause the device to infer a flying-animal species identification based on the depth map, a calculated size of the flying object, changes in blob size, or combinations thereof.

In certain embodiments, the stereo pair of composite motion track images have a file size that is smaller than the thermal videos by at least a factor of 1/(frame rate×composite video clip duration).

In certain embodiments, the one or more programs, when executed, further cause the device to compare points in the one composite motion track image with points in the other composite motion track image only when the points in each image belong to blobs with the same frame index, and the blobs belong to corresponding tracks in each composite motion track image.

In some embodiments, a sensor system for 3D monitoring of flying objects, comprises a stereo pair of thermal video cameras; non-transitory, computer-readable storage media storing videos from the stereo pair of thermal video cameras; and a processor operably connected to the storage media and configured to execute instructions of a program stored on the storage media to generate a 3D track of the flying object from a point-matched pair of stereo composite motion track images and not directly from the videos, wherein each composite motion track image comprises a composite of a plurality of video frames composited in part on video frame numbers.

The purpose of the foregoing summary and the latter abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. Neither the summary nor the abstract is intended to define the invention of the application, which is measured by the claims, nor is it intended to be limiting as to the scope of the claims in any way.

DETAILED DESCRIPTION

Figure 1:
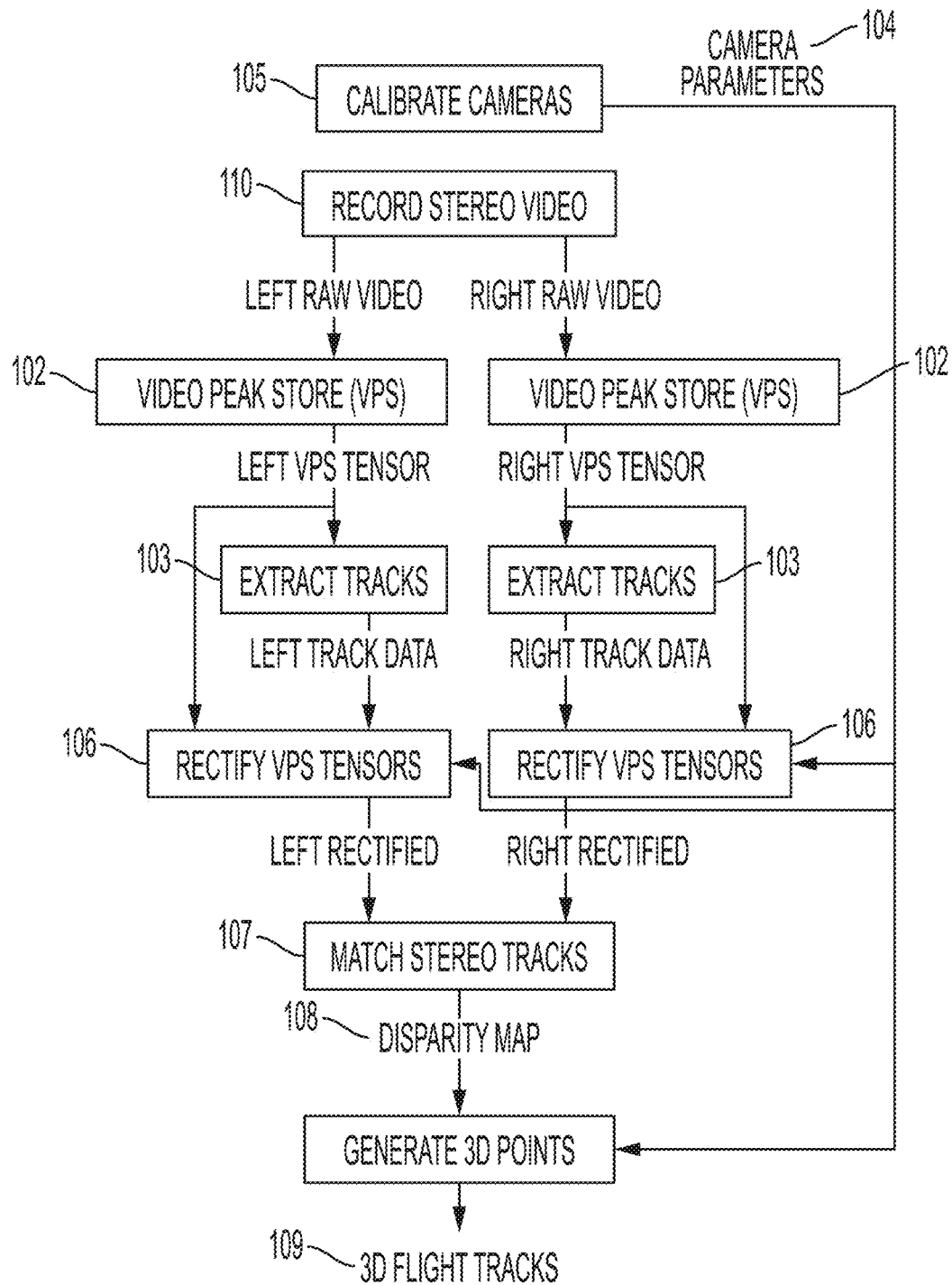
FIG. 1 is flow diagram depicting one embodiment for continuous monitoring and generation of 3D flight tracks.

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, angles, percentages, rates, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximations unless the word "about" is recited.

Embodiments disclosed herein include sensing methods, sensor systems, and non-transitory, computer-readable, storage medium having programs for long-duration, continuous monitoring of flying objects during the day or the night and regardless of weather conditions. The output comprises a computationally efficient and compact, three-dimensional representation of observed object motion. The output can further comprise detailed characterization of each motion track of observed objects. Any object having an observable thermal signature can be monitored.

The inventors have determined that understanding collision and displacement effects requires continuous observations of species-specific avian flight paths and patterns of activity at existing and proposed wind energy sites. Models for assessing risk use abundance, flight characteristics and avoidance rates to calculate the estimated risk for a particular species. Flight characteristics include flight height, flight speed and whether the bird is flapping or gliding. Avoidance at the macro level is defined as the avoidance of the wind farm as a whole and contributes to displacement and barrier affects. Avoidance at the micro level is defined as evasive action by an individual bird to avoid a collision with a single wind turbine, reducing collision risk. Some species are more capable of micro-avoidance than others, due to better perception and flight maneuverability. Avian abundance and activity at a particular location varies over the course of a diel cycle and with season, e.g. breeding and migration, and is also affected by weather conditions. Therefore, continuous observations are needed both day and night over the course of at least one annual cycle in order to generate an accurate picture of avian activity for the purpose of risk assessment. The inventors' understandings in the context of environmental conservation has motivated some aspects of embodiments disclosed herein, however applications of the embodiments are not limited to monitoring around wind turbines. For example, any object having an observable thermal signature can be sensed and monitored. Another instance in which long-term, continuous monitoring capability is relevant includes security monitoring at various locations and/or at the airspace over such locations. Objects to be monitored can include planes and unmanned aerial vehicles (UAVs).

Accordingly, embodiments disclosed herein can provide remote sensing of moving animals and other objects using stereo thermal video. Three-dimensional tracking of moving objects can occur in near real-time and objects can be automatically identified based on features from motion track and object size determinations. 3D flight tracks of birds, bats and other flying objects can be extracted from videos from a stereo pair of thermal cameras. Generation of the 3D tracks does not involve inefficient conventional methods, but rather is computationally efficient and can run in real-time.

One embodiment of a method for monitoring 3D flight tracks comprises first extracting 2D flight tracks from each of a pair of thermal cameras in a stereo configuration and then applying stereo vision processing to a pair of rectified flight track images. The flight track images can be generated by collapsing a sequence of video frames into a single image that shows an entire flight track through the camera's field of view. The method makes use of both spatial and temporal information in order to align and match the tracks in the two images. The temporal information is used to overcome the challenge of matching objects in a stereo pair of thermal images, where the shapes and spatial features in the images may be somewhat blurry due to motion and/or the low resolution of the thermal cameras relative to visible spectrum cameras.

In the embodiment illustrated in FIG. 1, 2D tracks are extracted from raw video 110 from each thermal camera in the stereo pair. In certain embodiments, a video peak store (VPS) module 102 is used to generate VPS images from which 2D flight tracks are extracted 103. Camera parameters 104 obtained from a camera calibration 105, in addition to VPS tensors, are used to rectify 2D track data 106 from the left and right thermal cameras. The two rectified images are matched 107 and a depth map (also called a disparity map) 108 is determined in order to generate 3D points from the matched stereo tracks. One result is a determination of 3D flight tracks 109 that were observed from each of the thermal cameras in the stereo pair. Embodiments described herein can produce a compact, visual representation of an observed flying object's motion along with a detailed characterization of its motion track.

Non-transitory as used herein when referring to a computer-accessible medium, is a limitation of the medium itself (i.e., tangible, not a propagating electromagnetic signal) as opposed to a limitation on data storage persistency. The term is not intended to otherwise limit the type of physical computer-readable storage device that is encompassed by the phrase computer-accessible medium or memory. For instance, the terms "non-transitory computer readable medium" or "tangible memory" are intended to encompass types of storage devices that do not necessarily store information permanently, including but not limited to, computer-readable media that store data only for short periods of time and/or only in the presence of power, such as register memory, processor cache and Random Access Memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

Figure 2:
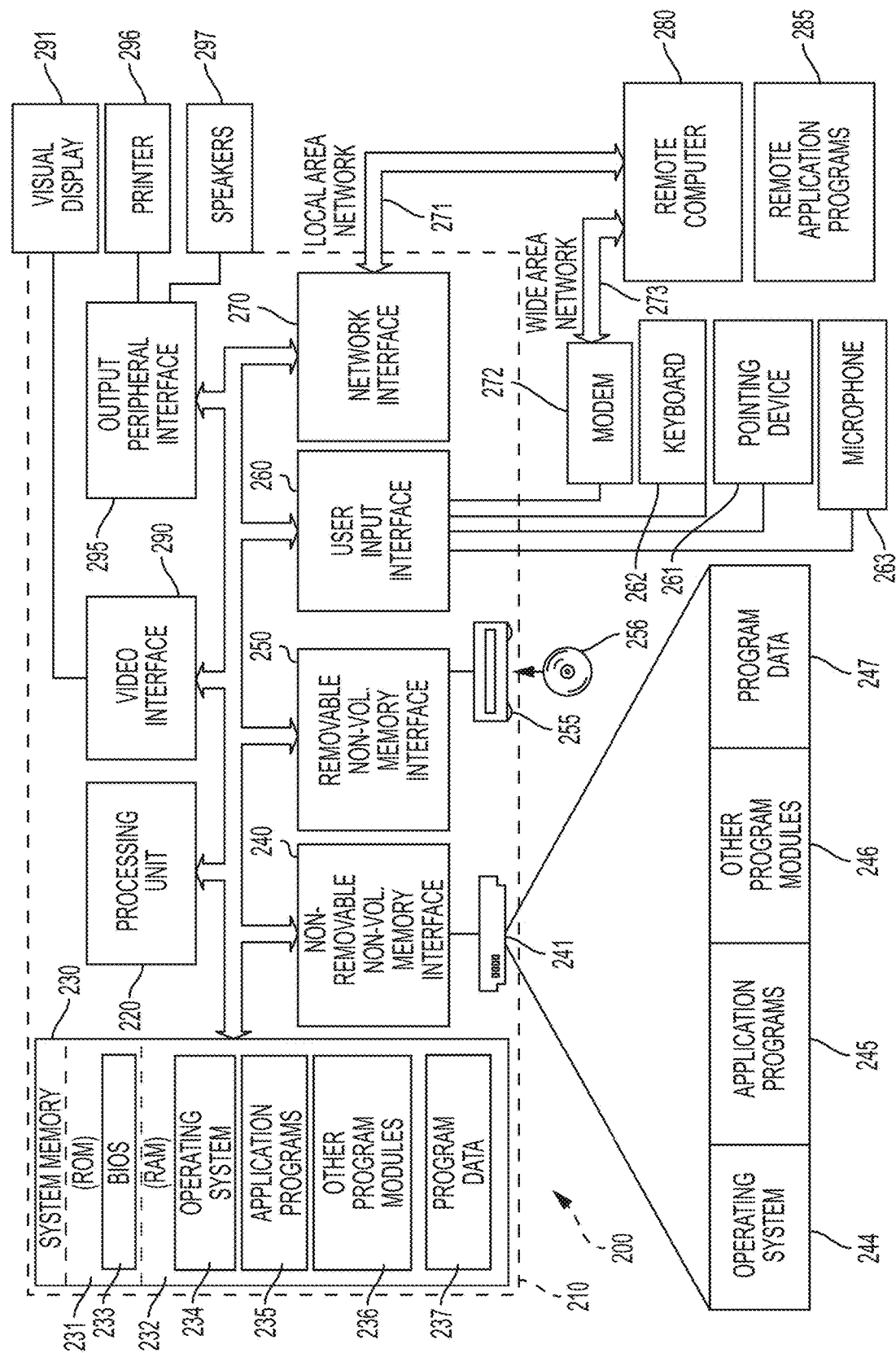
FIG. 2 is a diagram depicting one embodiment of a computing device to which a stereo pair of thermal cameras can be operably connected.

FIG. 2 is one embodiment of a computing environment for processing data from a stereo pair of thermal cameras and/or to which the stereo pair of thermal cameras can be operably connected. In one example, a computing environment such as shown in FIG. 2 can be used to calibrate the cameras, record stereo video, perform stereo vision processing, determine 3D flight tracks, and/or determine characteristics about a flying object and its flight track. The thermal cameras can connect to a network interface as part of a local area network via Gigabit Ethernet (GigE).

With reference to FIG. 2, an example system for implementing some embodiments includes a general-purpose computing device in the form of a computer 210. Components of computer 210 may include, but are not limited to, a processing unit 220 (which is not limited to CPUs, but can comprise GPUs), a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described herein be deployed in corresponding portions of FIG. 2.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, sash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computer 210. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 230 includes computer storage media in the form of volatile and/or nonvolatile memory such as read only memory (ROM) 231 and random-access memory (RAM) 232. A basic input/output system 233 (BIOS), containing the basic routines that help to transfer information between elements within computer 210, such as during startup, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/nonremovable volatile/nonvolatile computer storage media. By way of example only, FIG. 2 illustrates a hard disk drive 241 that reads from or writes to non-removable, nonvolatile magnetic media, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, sash memory cards, digital versatile disks, digital video tape, solid state RAM, solid state ROM, flash memory devices, and the like. The hard disk drive 241 is typically connected to the system bus 221 through a nonremovable memory interface such as interface 240, and optical disk drive 255 are typically connected to the system bus 221 by a removable memory interface, such as interface 250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs), etc.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies.

A user may enter commands and information into the computer 210 through input devices such as a keyboard 262, a microphone 263, and a pointing device 261, such as a mouse, trackball or touch pad. Other input devices (not shown) may include a joystick, game pad, scanner, or the like. These and other input devices are often connected to the processing unit 220 through a user input interface 260 that is coupled to the system bus, but may be connected by other interface and bus structures, such as a parallel port, game port or a universal serial bus (USB). A visual display 291 or other type of display device is also connected to the system bus 221 via an interface, such as a video interface 290. Video interface 290 can comprise a graphics card having a GPU. The GPU be used for computations. In addition to the monitor, computers may also include other peripheral output devices such as speakers 297 and printer 296, which may be connected through an output peripheral interface 295.

The computer 210 can be operated in a networked environment using logical connections to one or more remote computers, such as a remote computer 280. The remote computer 280 may be a personal computer, a hand-held device, a server, a router, a network PC, a peer device or other common network node, and typically includes many or all of the elements described above relative to the computer 210. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on remote computer 280. It will be appreciated that the network connections shown are exemplary and other means of establishing a communications link between the computers may be used.

EXAMPLES AND COMPARISONS

To further illustrate certain embodiments of the disclosed sensing methods, non-transitory computer-readable storage media, and sensing systems, and to provide various comparative analyses and data, below are some examples.

Figure 3:
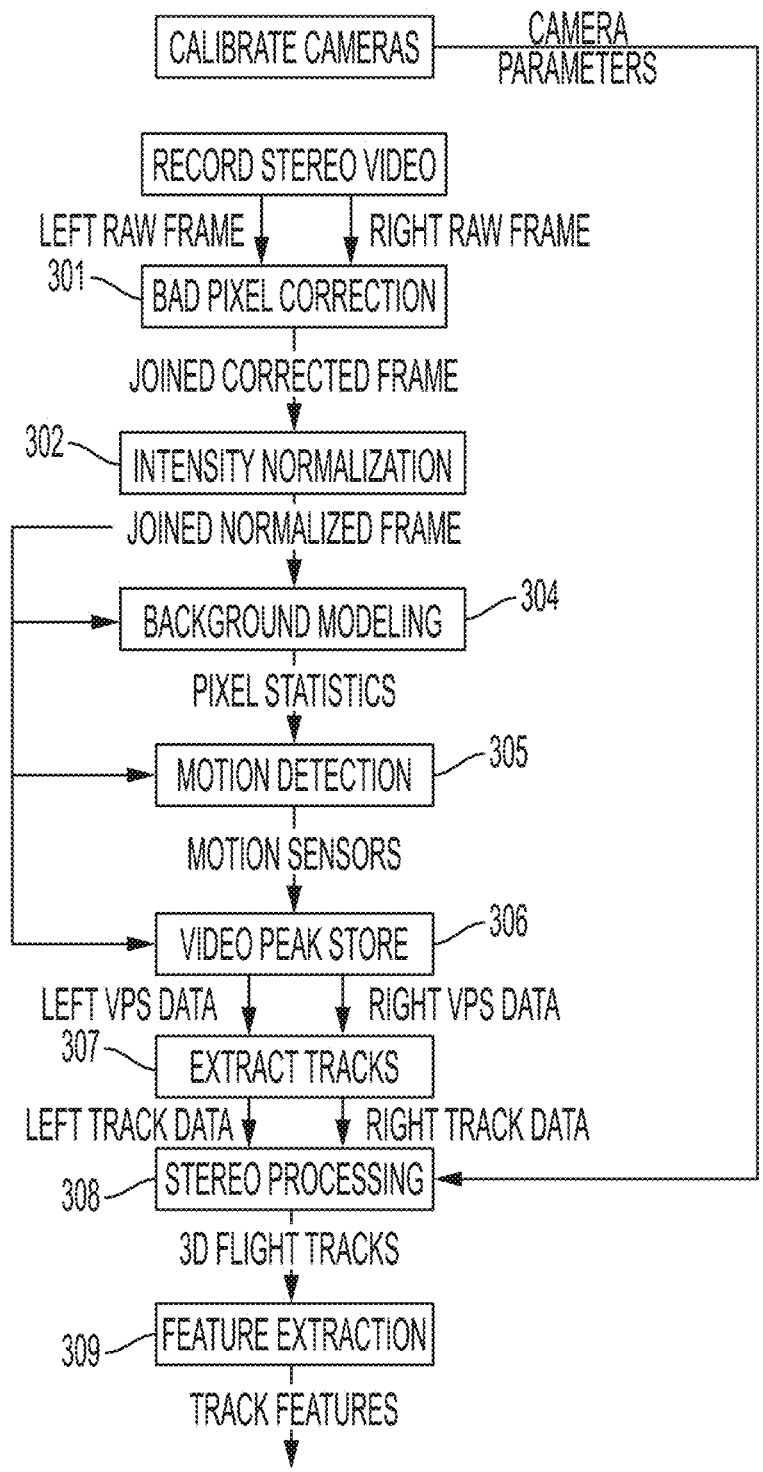
FIG. 3 is a flow diagram depicting one embodiment for continuous monitoring and generation of 3D flight tracks.

In order to understand spatial flight patterns and to identify species, three dimensional flight information is typically necessary. Three-dimensional flight tracks allow more accurate estimates of flight height and location. This can be critical, for example in the region of a rotor-swept zone of a wind turbine. Knowing the distance of an animal from the camera makes it possible to estimate the size of the animal, which aids in taxonomic identification. Embodiments described herein can perform stereo vision processing on a pair of VPS images, rather than on each individual video frame, and only matches points from corresponding blobs rather than every point in the scene. The result is a highly efficient 3D flight track extraction method that can run in real time. According to one embodiment (depicted in FIG. 3), the processing chain can comprise bad pixel correction 301, intensity normalization 302, background modeling 304, motion detection 305, enhanced video peak store 306, track formation 307, stereo processing 308, and feature extraction 309.

Figure 5:
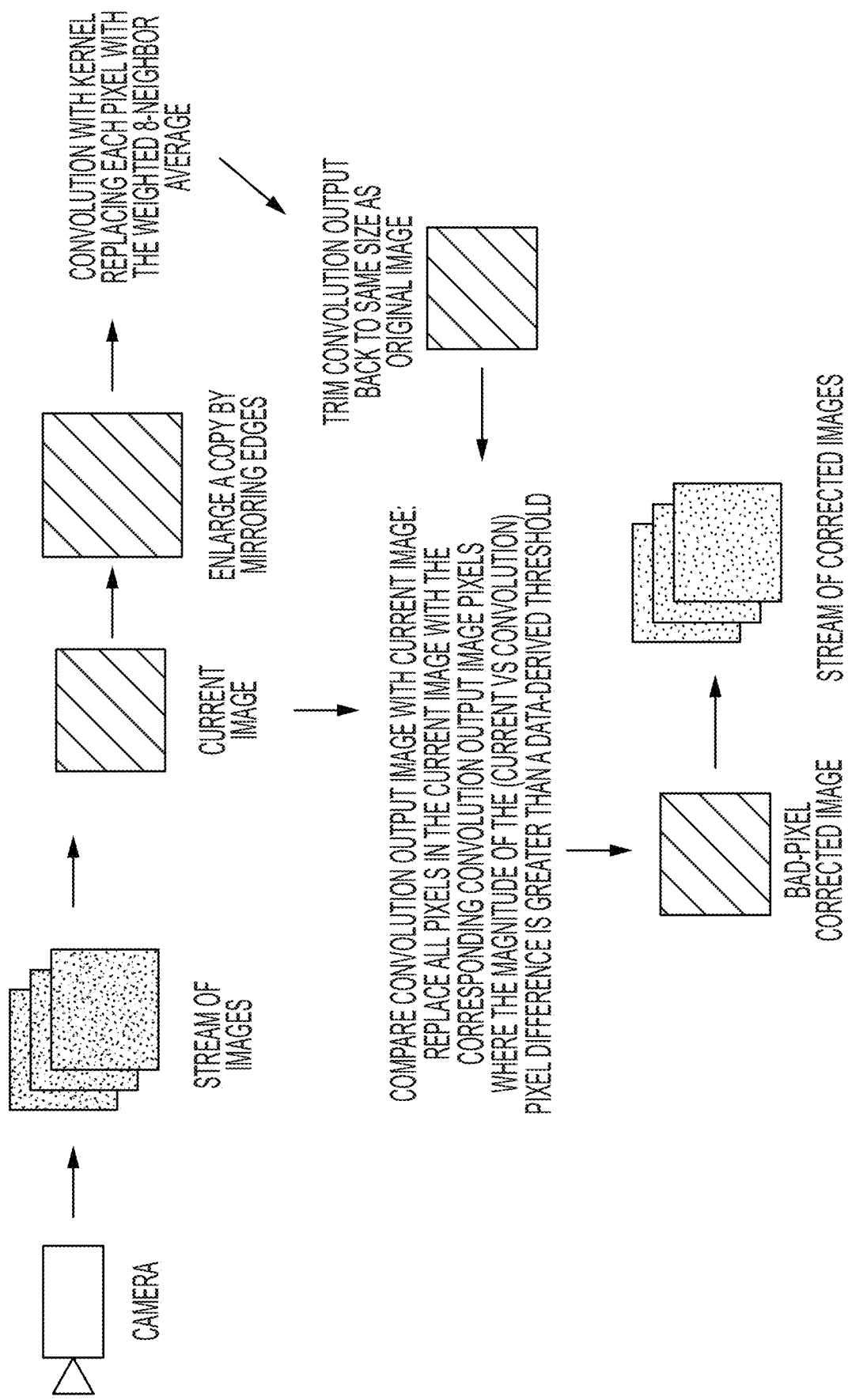
FIG. 5 is a flow chart depicting an embodiment for bad pixel correction.

Images can first be corrected for bad pixels 301, then image intensity is normalized to maintain good target/background separation. This can be important over time as changes in ambient temperature, solar radiation and haze occur. Bad pixel correction entails identifying pixels that likely have a bad value and replacing them with an estimated correct value. One example is depicted in the flow chart of FIG. 5. In certain embodiments, bad pixels are assumed to be isolated, i.e. single pixels surrounded by good pixels. To detect bad pixels, a new image is created where each pixel is given the value of the distance-weighted average of its eight neighbors by convolving the original image with the following kernel:

| 0.1035 | 0.1464 | 0.1035 |
|--------|--------|--------|
| 0.1464 | 0      | 0.1464 |
| 0.1035 | 0.1464 | 0.1035 |

The original image can be subtracted from the new image, and the absolute value of the difference of each pixel is compared to a threshold. In certain embodiments, the threshold can be calculated as a percentage of the new image pixel value. Any pixels above the threshold are assumed to be either too bright or too dark relative to what's expected based on the eight-neighbor average, and those suspect values are replaced by the eight-neighbor average.

Figure 4:
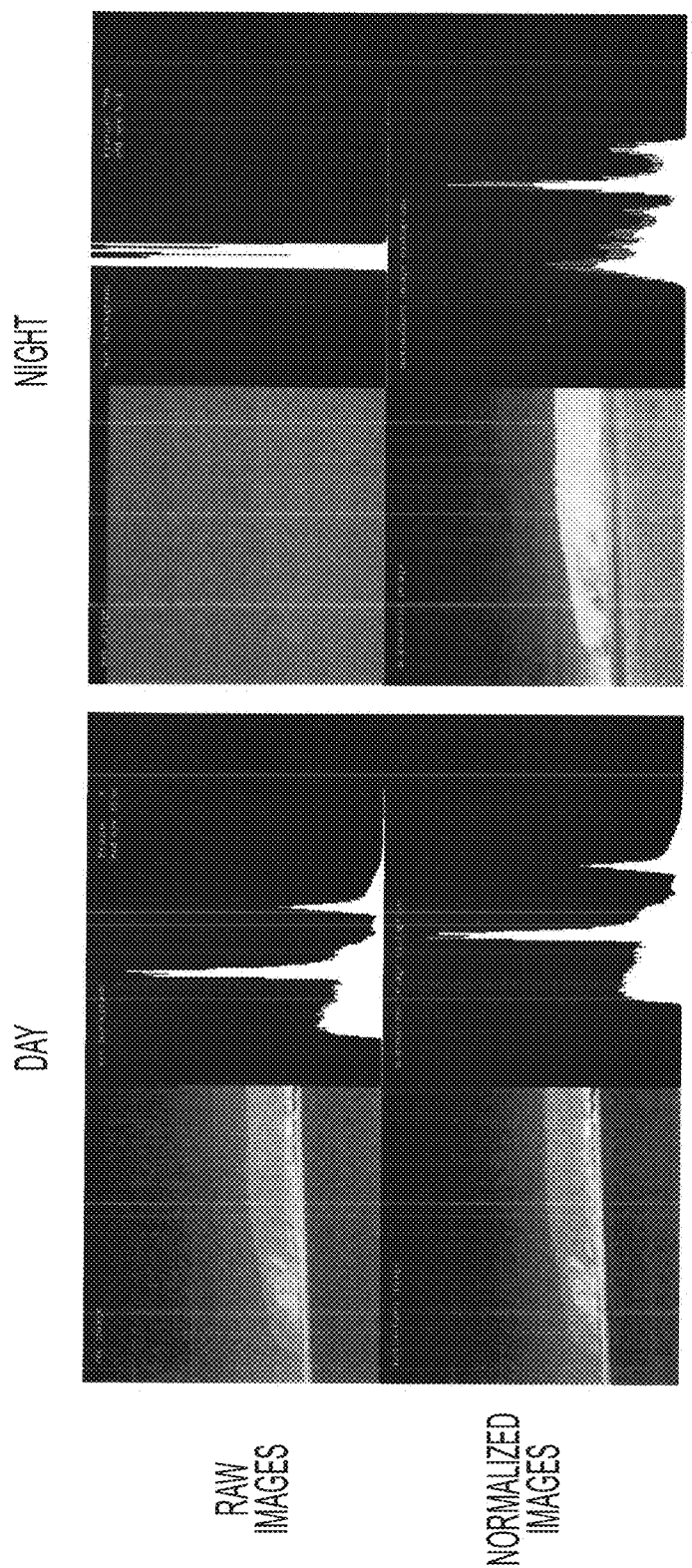
FIG. 4 compares raw and normalized thermal images and intensity histograms for data collected during the day and at night.
Figure 6:
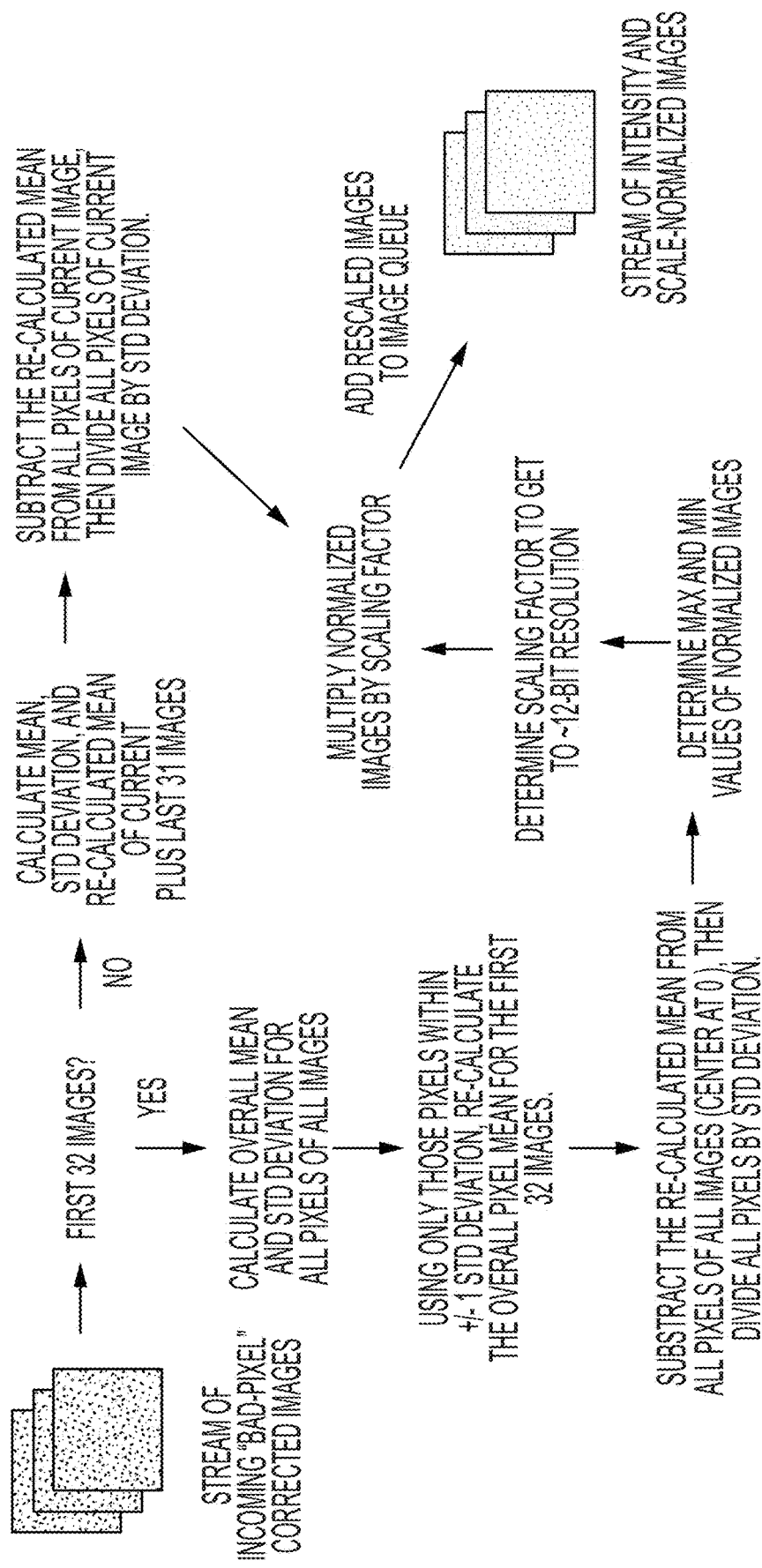
FIG. 6 is a flow chart depicting an embodiment for intensity scale normalization.

Intensity normalization 302 can be performed to preserve a consistent contrast under variable temperature and visibility conditions. This occurs in three parts. First, a sliding temporal window of the most recent 24-32 frames is used to find the brightest and darkest pixels over that time (incoming dynamic range), as well as the overall mean pixel average value over that time (for all pixels in the image, not for each pixel location in the image). These values are stored and kept, as they characterize the original source data. Next, using that average, the pixel standard deviation is calculated for the current incoming image; this is also kept with the image as a measure of intrinsic contrast. (Note that the left and right camera images each keep their own statistics, but that both images can be processed together as one joined image.) Finally, each pixel in the incoming image is set to its raw value minus the frame average intensity value and divided by the frame average of the standard deviations. This acts to normalize the moving average of the images to a zero-mean intensity distribution with a standard deviation of one. If processing as floating-point, the pixel values can be left in this format. If processing later as integers, the values should be multiplied by a suitable constant to be in the range of −2048 to +2048 for a 12-bit intensity range. An example of intensity scale normalization is shown in FIG. 6. The images will now have a fairly constant dynamic range, but the contrast-to-noise ratio and the sharpness can still vary. The pre-normalization standard deviation or the brightest/darkest pixel range can both serve as proxies for the expected contrast-to-noise ratio. FIG. 4 compares examples of raw and normalized images, including intensity histograms, for data collected in daylight and at night.

Figure 7:
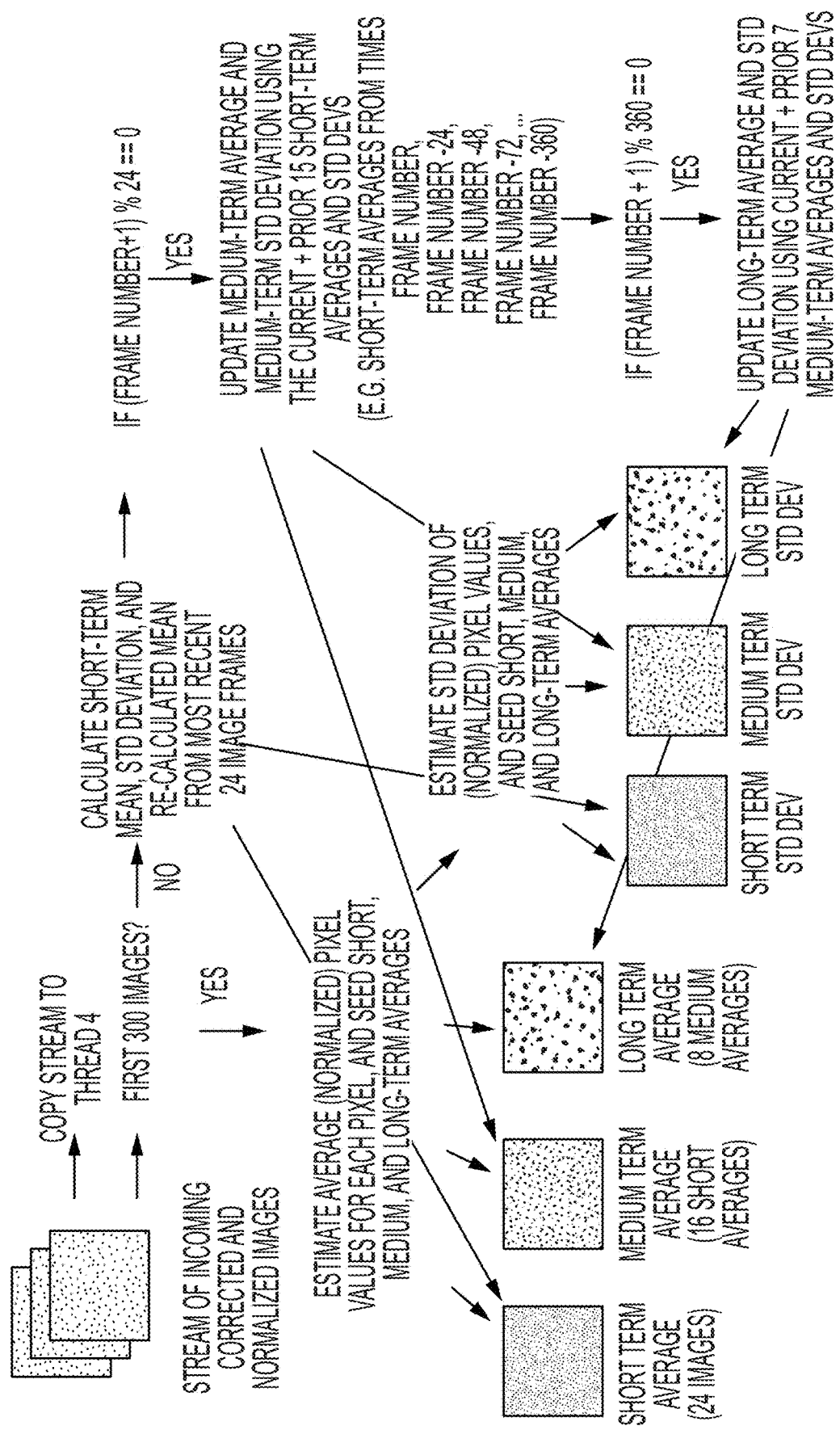
FIG. 7 is a flow chart depicting an embodiment for background modeling.

Because trackable objects will appear as bright (thermally hot) objects against a darker background, in certain embodiments, background modeling 304 is applied so that only those pixel intensities above the background mean plus background noise need to be identified. One example of background modeling is depicted in FIG. 7. It can be assumed that the intensity at each pixel follows a normal distribution described by its mean and standard deviation. The background noise amplitude is estimated as being some constant multiplied by the standard deviation, and values less than each pixel's mean can be ignored altogether—if it is too dark, it is highly unlikely to be an object of interest (e.g., an animal or UAV). The background can be estimated by calculating a moving short-term average and standard deviation from the incoming corrected-and-normalized image streams from each camera. Every 24-32 images, a snapshot of the short-term average and standard deviation is used to update a moving average medium-term estimate from the last 16-24 short-term averages and short-term standard deviations. Similarly, every 8-16 medium-term estimate updates, the present update is used to uptake the moving average (and standard deviation) of the last 8-16 medium-term estimates.

Figure 8:
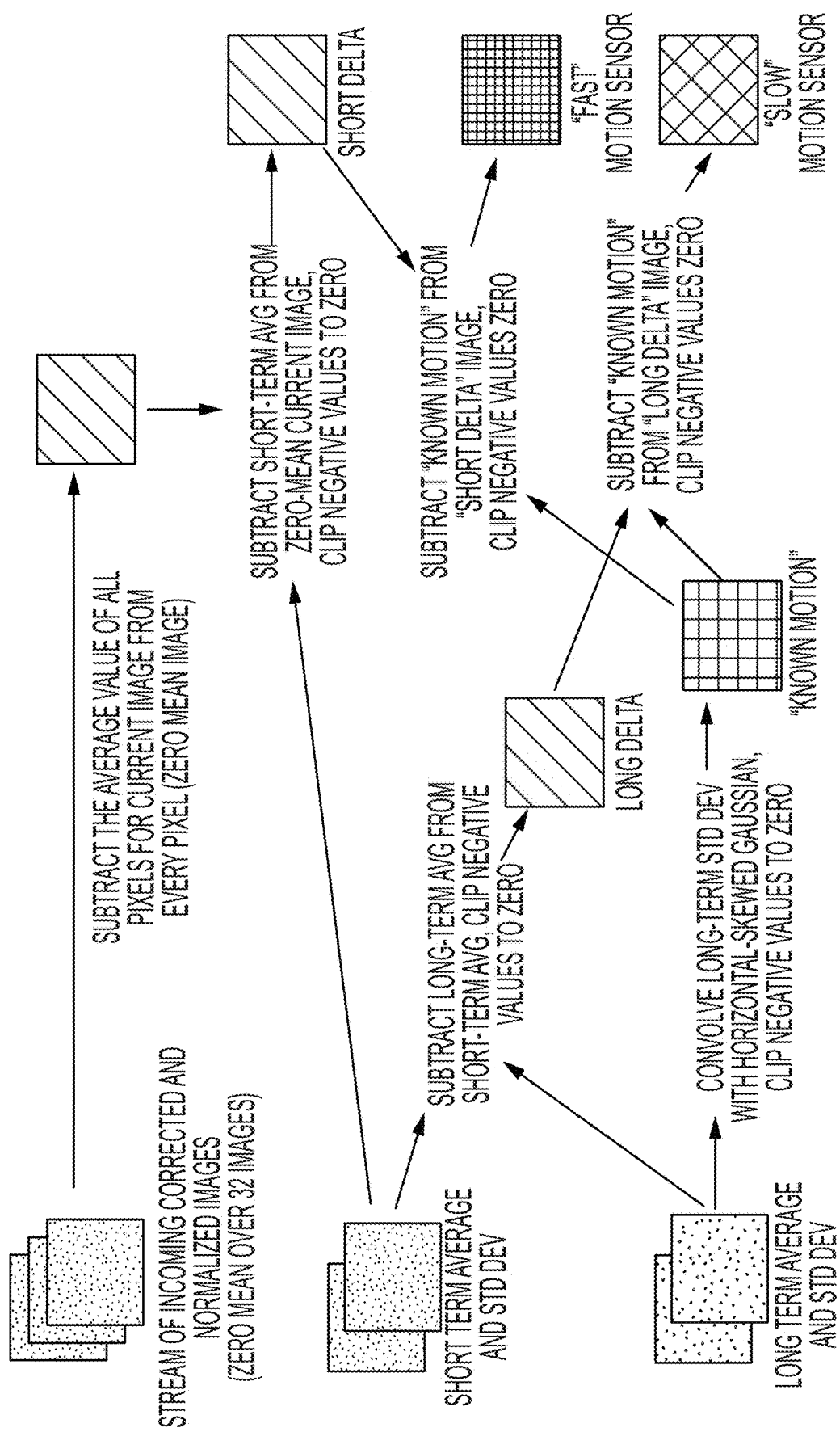
FIG. 8 is a flow chart depicting an embodiment for motion detection.

Background image noise at each pixel ("known motion") is estimated performing a Gaussian blur on the long-term standard deviation estimate. Depending on the scene and the camera orientation, the blurring can be applied more strongly along the horizontal axis than along the vertical axis, or vice versa. Examples of known motion may include sea surface chop or shaking leaves on a tree. This "known motion" estimate of background noise is further scaled by a threshold value tied to image contrast. Similarly, if the difference between the short-term moving average and the long-term moving average exceeds the threshold, some kind of "slow" motion is being detected (such as clouds or a slow-moving boat). When the current pixel value exceeds the known-motion estimate, both "fast" and "slow" motion is detected 305. By using the "slow" motion detection as a mask, "fast-moving" image pixels can be detected, and "slow-moving" image pixels can be replaced with a long-term average value. This replaces "slow motion" pixels with a more-easily-recognized value, and avoids cluttering the VPS images with non-changing objects. An example of a process for motion detection is depicted in the flow chart of FIG. 8.

Figure 9:
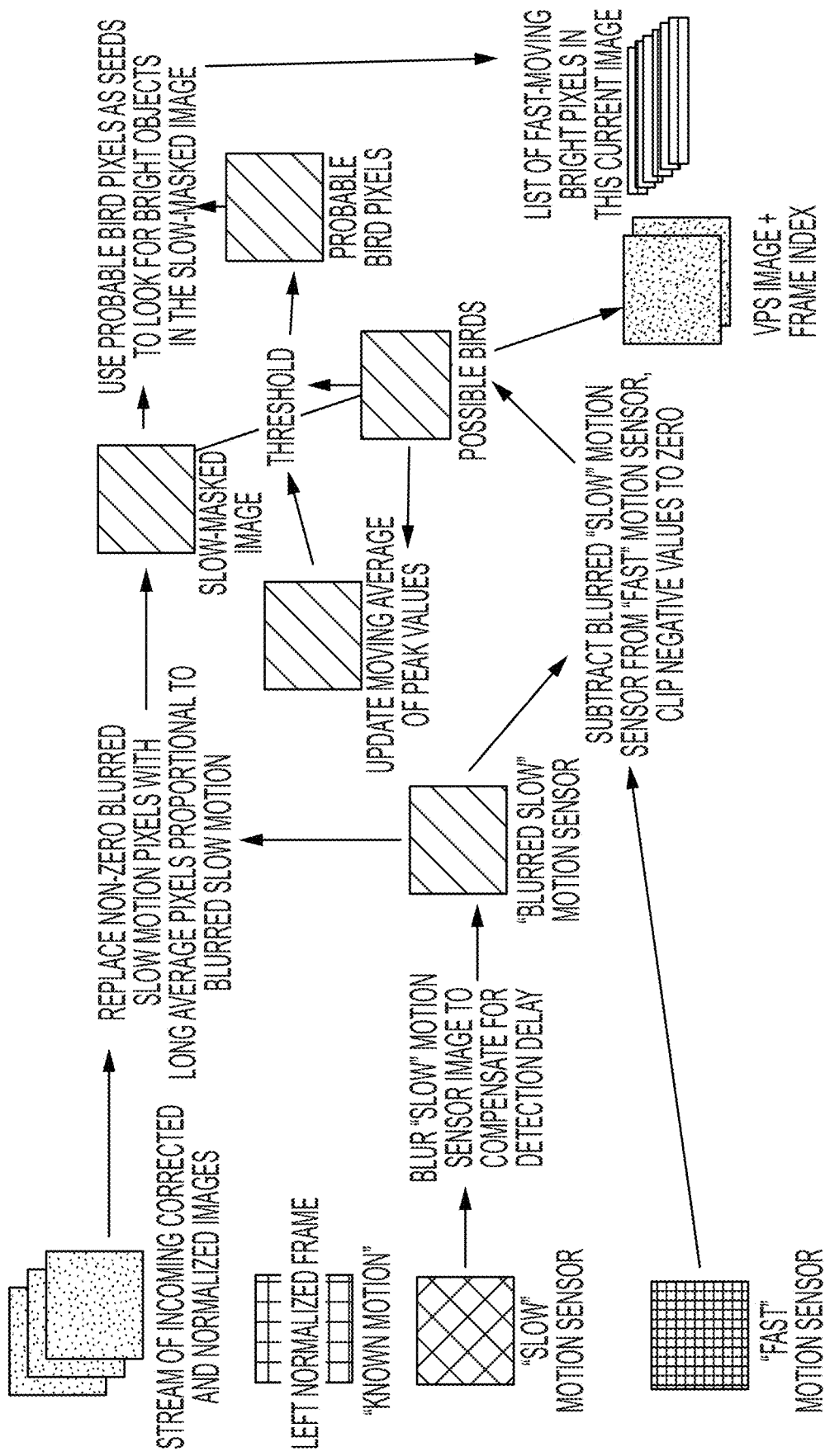
FIG. 9 is a flow chart depicting an embodiment for video peak storing.

Enhanced video peak store 306 can be used to split the stream of bad-pixel-corrected and intensity-range-normalized input images into discrete, overlapped time slices referred to as VPS windows, each comprising several hundred images. The output of this processing step can be a data structure composed of three elements: a video peak store (VPS) image (also called a maximum intensity projection image) that contains the brightest intensity for each pixel over the time interval, and a list of the foreground pixels including their frame index. Foreground pixels are pixels with a peak value that exceeds the background model thresholds based on the motion detection described previously. The frame index of each foreground pixel is the frame number relative to the start of the time slice, corresponding to the peak value in the VPS image. An example of a process for video peak storing is depicted in FIG. 9.

Figure 10:
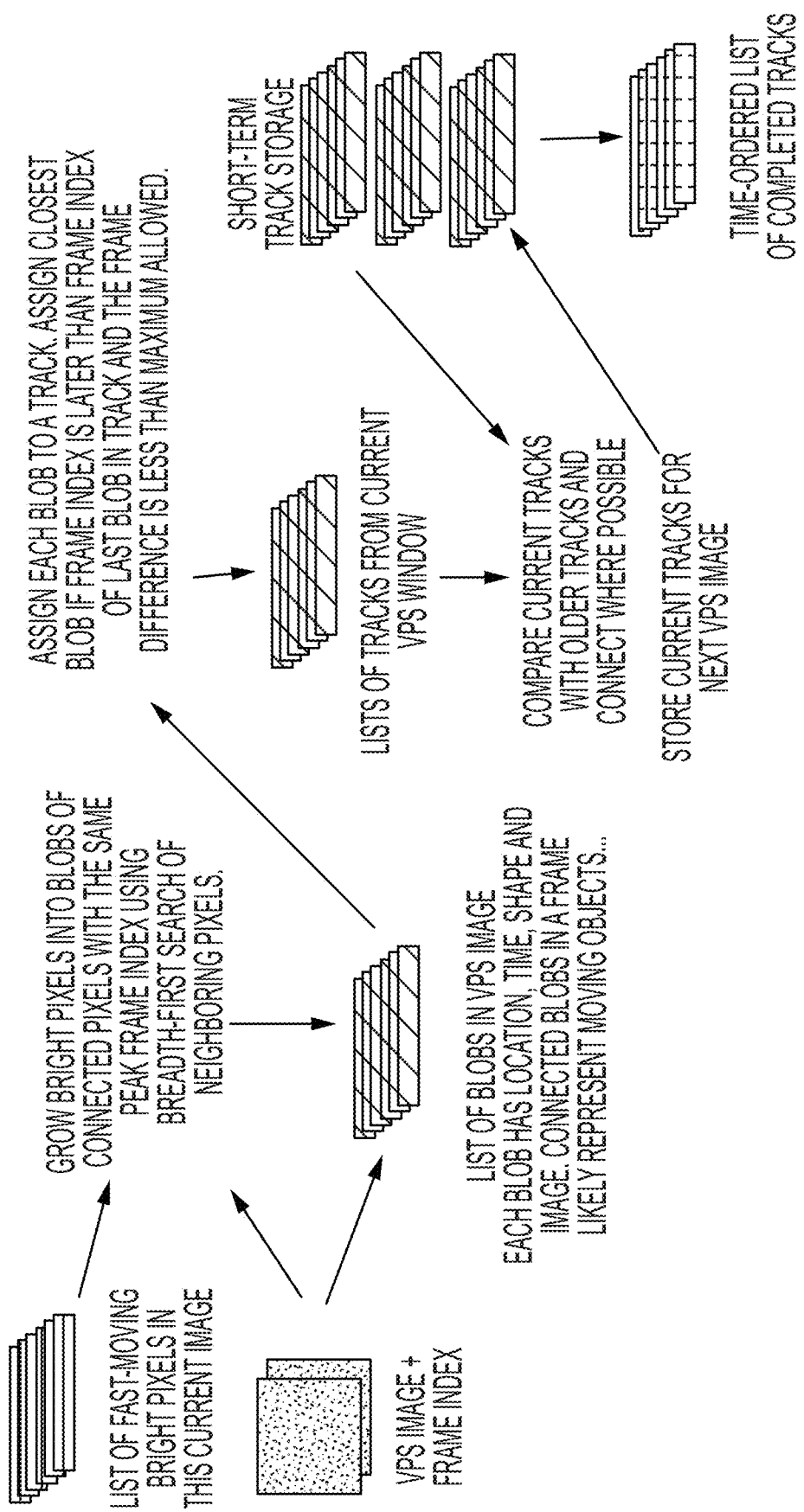
FIG. 10 is a flow chart depicting an embodiment for extracting flight tracks.

Track formation 307 can be based on a flying object appearing as a blob of connected pixels in a thermal video image. One embodiment is depicted in the flow chart shown in FIG. 10. Blobs are formed in a VPS image using a region-growing approach. Each foreground pixel in the VPS image is used as the "seed" of a region to grow into a blob of connected pixels. Using a breadth-first search algorithm, all the neighbors of a seed pixel that have the same frame index as the seed pixel are added to the blob. Then all the neighbors of each neighbor of the original seed pixel with the same frame index are added, and so on until there are no more neighboring pixels with the same frame index. Blob formation is complete when all foreground pixels have been formed into blobs. Each blob is then assigned to a track based on spatial nearness, similarity of size and intensity and temporal sequence using the frame index of the blob. The output of this processing step is a list of tracks, where each track is an ordered list of blobs. The blobs are lists of pixels that belong to the blob, and each blob has a frame index.

Figure 11:
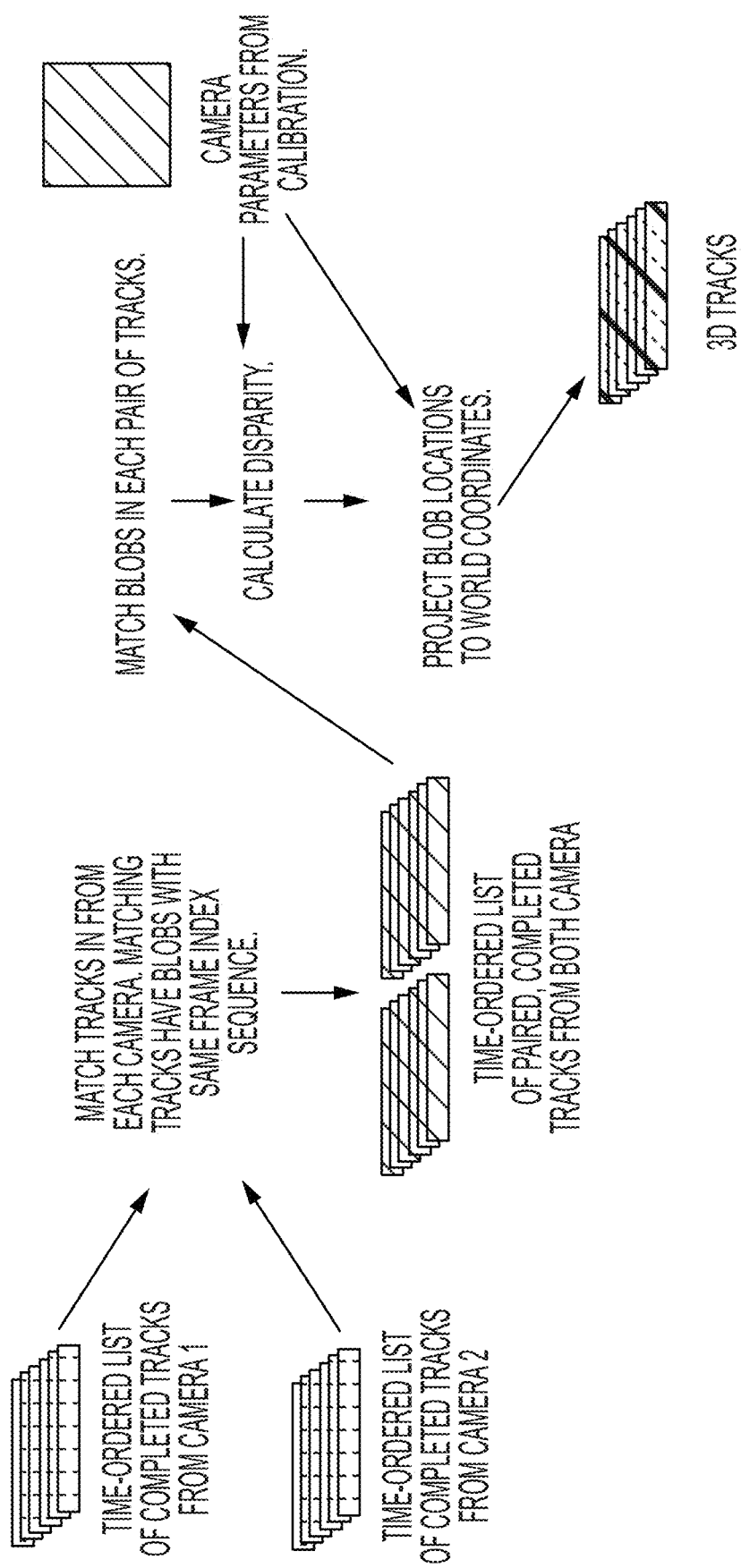
FIG. 11 is a flow chart depicting an embodiment for stereo processing of data from a pair of thermal cameras.

Stereo vision processing 308 can involve matching points from one image of a stereo pair with points in the other image. An example of stereo vision processing is shown in FIG. 11. In one instance, stereo matching uses epipolar geometry to find the real world location of the point corresponding to the matched pair of image points. The epipolar geometry of the stereo vision system is estimated from a calibration procedure. Prior to point matching, the two stereo images can be rectified so that epipolar lines are parallel and corresponding points in each image will be located at the same vertical position in each image. Let $p_l=[x, y]^T$ be a point in the left rectified image. Then the corresponding point in the right rectified image is $p_r=[x+d, y]^T$ where d is the disparity. Disparity is the difference between the image location of a real-world point in each of the stereo images due to their different perspectives. Rectification limits the disparity to one dimension, simplifying the matching process. Our method operates on the track data from each camera. First each track from the left camera is paired with a corresponding track from the right camera. Tracks are paired based on the frame index of the first and last few blobs in each track. If there are multiple possible matches, then spatial location is used to select the best match. For each pair of tracks, the corresponding blobs in each track are used to calculate the disparity. The disparity is assumed to be constant for all pixels in the blob. A blob from the left track and the blob from the right track with the same frame index are matched, and the difference between the location of their maximum intensities is used as an estimate of the disparity for the blob. Once the disparity is calculated for each matching pair of blobs in the track, then 3D points for the track are calculated using triangulation. The 3D track points are adjusted to enforce smoothness in the trajectory and to minimize geometric error.

Figure 12:
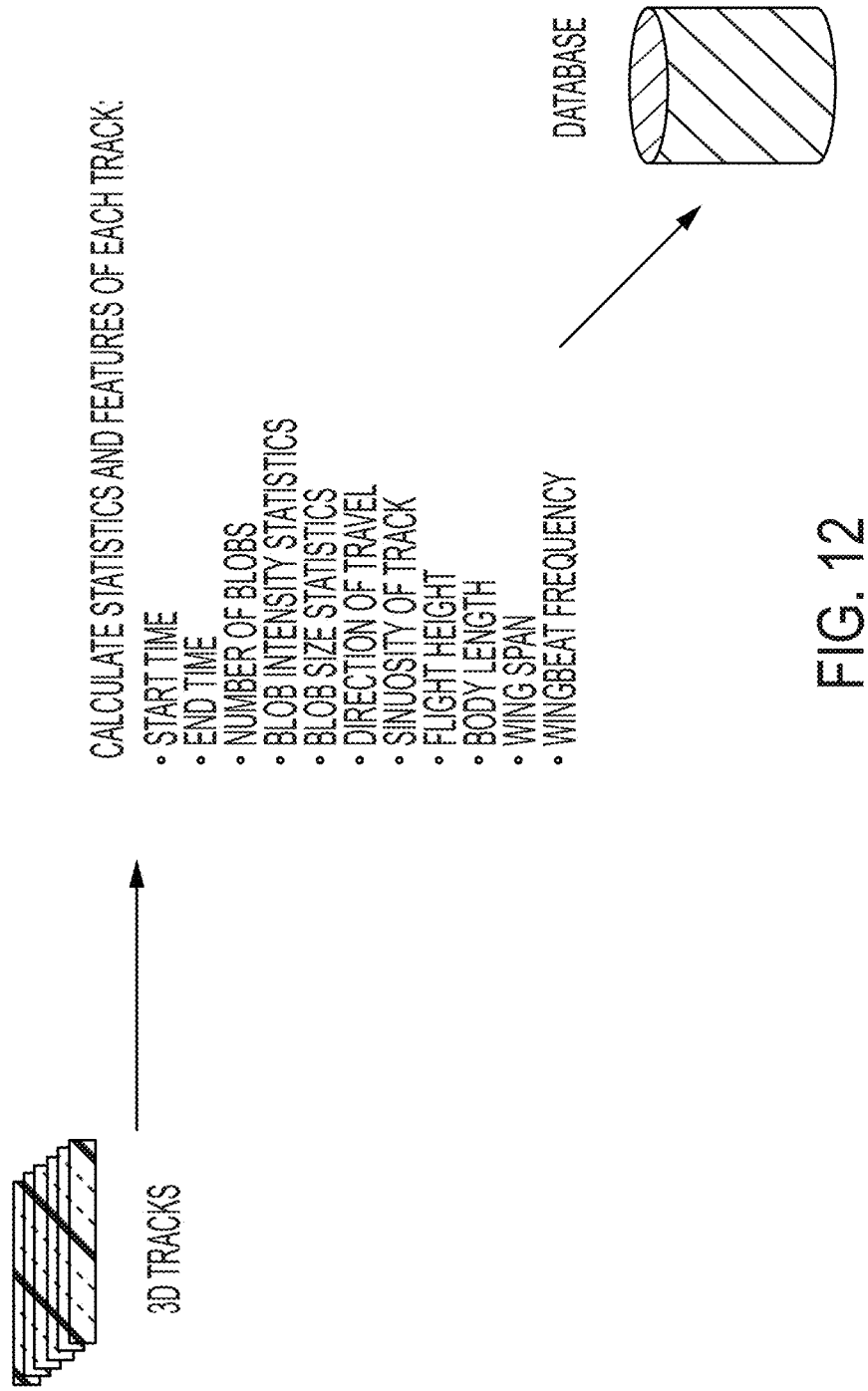
FIG. 12 is a flow chart depicting an embodiment for feature extraction.

Described herein are methods and systems that facilitate extraction of many different features and statistics. An example is depicted in FIG. 12. For each track, the timestamps and 3D coordinates of the object's positions along the track are used to calculate features and statistics 309. Examples can include, but are not limited to, start time, end time, number of blobs, blob intensity statistics, blob size statistics, direction of travel, sinuosity of track, flight height, body length, wing span, wingbeat frequency, and combinations thereof. These features and statistics can be used to identify the species of the animal.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A sensing method comprising the steps of:
    for each of a stereo pair of thermal cameras providing thermal video, wherein the stereo pair of composite motion track images each has a file size that is smaller than that of the thermal videos by at least a factor of 1/(frame rate×composite video clip duration):
    combining a sequence of video frames into a single composite motion track image, wherein each pixel value in the composite motion track image is a peak value of a pixel location over the sequence of video frames;
    detecting bright pixels in the composite motion track image that correspond to a flying object;
    connecting a plurality of adjacent bright pixels into a blob;
    assigning each blob to a 2D flight track in sequential order according to a time index associated with each blob;
    for a stereo pair of composite motion track images, matching a subset of points in one composite motion track image with a subset of points in the other composite motion track image based at least on the time indices, thereby yielding a point-matched pair of stereo composite motion track images; and
    generating a depth map based on the point-matched pair of images.

2. The method of claim 1, wherein the flying object is a flying animal or an unmanned aerial vehicle (UAV).

3. The method of claim 1, further comprising representing the blobs as data structures stored on non-transitory, computer-readable storage media, the data structures comprising a list of member pixels and an associated time index for member pixels.

4. The method of claim 1, wherein said yielding a point-matched pair of stereo composite motion track images occurs at a speed that is at least as fast as the frame rate of the thermal video such that the method is a real-time method.

5. The method of claim 1, further comprising estimating an altitude of the flying object, a camera-to-flying-object distance, or both based on the depth map.

6. The method of claim 1, further comprising estimating a size of the flying object based on the depth map, camera resolution, and camera field of view.

7. The method of claim 1, further comprising tracking fluctuations in blob size in one or both of the stereo pair of composite motion track images and correlating the fluctuations in blob size to wing beats of a flying animal or rotor rotations of a UAV.

8. The method of claim 1, further comprising inferring a flying-animal species identification based on the depth map, a calculated size of the flying object, fluctuations in blob size, flight track, or combinations thereof.

9. A sensing method comprising the steps of:
    for each of a stereo pair of thermal cameras providing thermal video:
    combining a sequence of video frames into a single composite motion track image, wherein each pixel value in the composite motion track image is a peak value of a pixel location over the sequence of video frames;
    detecting bright pixels in the composite motion track image that correspond to a flying object;
    connecting a plurality of adjacent bright pixels into a blob;

assigning each blob to a 2D flight track in sequential order according to a time index associated with each blob;

for a stereo pair of composite motion track images, matching a subset of points in one composite motion track image with a subset of points in the other composite motion track image based at least on the time indices, thereby yielding a point-matched pair of stereo composite motion track images; and generating a depth map based on the point-matched pair of images.

wherein said matching step further comprises comparing points in the one composite motion track image with points in the other composite motion track image only when the points in each image belong to blobs with the same frame index, and the blobs belong to corresponding tracks in each composite motion track image.

10. The method of claim 9, wherein the stereo pair of thermal cameras are arranged on, or in the vicinity of, a wind turbine and further comprising monitoring a swept area of the wind turbine.

11. A non-transitory computer readable storage medium storing one or more programs, the one or more programs comprising instructions, which when executed by one or more processors of an electronic device with access to video from a stereo pair of thermal cameras, wherein the stereo pair of composite motion track images have a file size that is smaller than the thermal videos by at least a factor of 1/(frame rate×composite video clip duration) cause the device:

for each thermal camera in the stereo pair of thermal cameras:
to combine a sequence of video frames into a single composite motion track image, wherein each pixel value in the composite motion track image is a peak value of a pixel location over the sequence of video frames;
to connect a group of adjacent pixels into blobs corresponding to an individual flying object;
to assign each blob to a 2D flight track in sequential order according to a time index associated with each blob;

for a stereo pair of composite motion track images, to match a subset of points in one composite motion track image with a subset of points in the other composite motion track image based at least on time indices, thereby yielding a point-matched pair of stereo composite motion track images; and to generate a depth map based on the point-matched pair of images.

12. The non-transitory, computer-readable, storage medium of claim 11, wherein the flying object is a flying animal or an unmanned aerial vehicle (UAV).

13. The non-transitory, computer-readable, storage medium of claim 11, storing one or more programs, which when executed further cause the device to represent the blobs as data structures comprising a list of member pixels and an associated time index for member pixels.

14. The non-transitory, computer-readable, storage medium of claim 11, wherein the time index comprises a video frame number.

15. The non-transitory, computer-readable, storage medium of claim 11, storing one or more programs, which when executed further cause the device to estimate an altitude of the flying object, a camera-to-flying-object distance, or both based on the depth map.

16. The non-transitory, computer-readable, storage medium of claim 11, storing one or more programs, which when executed further cause the device to estimate a size of the flying object based on the depth map.

17. The non-transitory, computer-readable, storage medium of claim 11, storing one or more programs, which when executed further cause the device to track changes in blob size in one or both of the stereo pair of composite motion track images and correlating the changes in blob size to wing beats of a flying animal or rotor rotations of a UAV.

18. The non-transitory, computer-readable, storage medium of claim 11, storing one or more programs, which when executed further cause the device to infer a flying-animal species identification based on the depth map, a calculated size of the flying object, changes in blob size, or combinations thereof.

19. A non-transitory computer readable storage medium storing one or more programs, the one or more programs comprising instructions, which when executed by one or more processors of an electronic device with access to video from a stereo pair of thermal cameras, cause the device:

for each thermal camera in the stereo pair of thermal cameras:
to combine a sequence of video frames into a single composite motion track image, wherein each pixel value in the composite motion track image is a peak value of a pixel location over the sequence of video frames;
to connect a group of adjacent pixels into blobs corresponding to an individual flying object;
to assign each blob to a 2D flight track in sequential order according to a time index associated with each blob;

for a stereo pair of composite motion track images, to match a subset of points in one composite motion track image with a subset of points in the other composite motion track image based at least on time indices, thereby yielding a point-matched pair of stereo composite motion track images; and to generate a depth map based on the point-matched pair of images which when executed further cause the device to compare points in the one composite motion track image with points in the other composite motion track image only when the points in each image belong to blobs with the same frame index, and the blobs belong to corresponding tracks in each composite motion track image.

* * * * *